(12) United States Patent
Ide et al.

(10) Patent No.: US 7,034,232 B2
(45) Date of Patent: Apr. 25, 2006

(54) KEYSHEET MODULE

(75) Inventors: Hidehiko Ide, Fujikawaguchiko-machi (JP); Isao Miyashita, Fujiyoshida (JP)

(73) Assignee: Citizen Electronics Co., Ltd., Yamanashi (JP)

( * ) Notice: Subject to any disclaimer, the term of this patent is extended or adjusted under 35 U.S.C. 154(b) by 21 days.

(21) Appl. No.: 10/924,190

(22) Filed: Aug. 24, 2004

(65) Prior Publication Data

US 2005/0047102 A1  Mar. 3, 2005

(30) Foreign Application Priority Data

Aug. 25, 2003 (JP) .......................... P2003-300209

(51) Int. Cl.
*H01H 9/00* (2006.01)
(52) U.S. Cl. ................... 200/5 A; 200/310; 200/512; 200/292; 341/22; 362/31
(58) Field of Classification Search ........ 200/511–513, 200/517, 310–317, 344, 292; 341/20–22, 341/31; 362/23, 29, 30–31
See application file for complete search history.

(56) References Cited

U.S. PATENT DOCUMENTS

| 3,877,790 | A | * | 4/1975 | Robinson ............... 349/143 |
| 4,158,115 | A | * | 6/1979 | Parkinson et al. ......... 200/5 A |
| 4,263,659 | A | * | 4/1981 | Hirata et al. ............. 708/138 |
| 4,336,431 | A | * | 6/1982 | Loose .................... 200/292 |
| 4,889,584 | A | * | 12/1989 | Wada et al. ............... 216/17 |
| 5,112,648 | A | * | 5/1992 | Okonogi et al. ........... 427/96.3 |
| 5,521,345 | A | * | 5/1996 | Wulc ..................... 200/317 |
| 5,664,667 | A | * | 9/1997 | Kenmochi ................ 200/314 |
| 5,950,808 | A | * | 9/1999 | Tanabe et al. ............. 200/314 |
| 6,010,742 | A | * | 1/2000 | Tanabe et al. ............. 427/66 |
| 6,373,008 | B1 | * | 4/2002 | Saito et al. .............. 200/310 |
| 6,455,950 | B1 | * | 9/2002 | Nishitani et al. .......... 307/10.1 |
| 6,552,289 | B1 | * | 4/2003 | Kawaguchi et al. ........ 200/512 |
| 6,603,086 | B1 | * | 8/2003 | Kawaguchi et al. ........ 200/517 |

FOREIGN PATENT DOCUMENTS

| JP | 2003-045701 | 2/2003 |
| JP | 2003-151391 | 5/2003 |

* cited by examiner

*Primary Examiner*—Richard K. Lee
(74) *Attorney, Agent, or Firm*—Browdy and Neimark, PLLC

(57) ABSTRACT

A keysheet module is provided which comprises: a one-sided printed circuit board having a plurality of wiring patterns formed on one side thereof; and contact switches, LEDs for illuminating a keypad, and electric elements such as resistors and capacitors, all provided on the one-sided printed circuit board; wherein an insulating layer is provided between predetermined, separate wiring patterns of the plurality of wiring patterns and a conductive film jumper is formed over the insulating layer to three-dimensionally connect the separate wiring patterns. With this arrangement, a degree of freedom of locating LEDs and electric elements is enhanced, improving a keypad illumination efficiency. The use of the conductive film jumper can reduce a thickness of the keysheet module.

10 Claims, 5 Drawing Sheets

KEYSHEET MODULE

CROSS REFERENCE TO RELATED APPLICATION

The application claims the priority benefit of Japanese Patent Application No. 2003-300209, filed on Aug. 25, 2003, the entire description of which are incorporated herein by reference.

BACKGROUND OF THE INVENTION

1. Field of the Invention

The present invention relates to a keysheet module used in small electronic devices such as mobile phones.

2. Description of Related Art

Small electronic devices such as mobile phones have conventionally incorporated a keysheet module having parts, such as dome-shaped contact switches and LEDs, mounted on a flexible printed circuit board (FPC board). The keysheet module is arranged on the underside of a keypad formed integral with a plurality of key tops (see prior art of Japanese Patent Disclosure No. 2003-151391).

FIG. 3 illustrates an example construction of a conventional keysheet module. In the figure, a keysheet module 1 comprises a printed circuit board 20 formed of glass epoxy resin, a plurality of dome-shaped contact switches 3 provided on an upper surface of the printed circuit board 20, fine wiring patterns 4 formed on the printed circuit board 20, LEDs 5 arranged appropriately between the wiring patterns 4 to illuminate the keypad, electric elements 6 such as resistors and capacitors, a white spacer 80 as a reflection plate fixedly bonded to an upper surface of the printed circuit board 20 to reflect upward the light emitted from the LEDs 5, a transparent switch fixing sheet 90 fixedly bonded to the upper surface of the printed circuit board including the spacer 80 to cover the upper surface of the contact switches 3 for their secure holding, and a flexible connector 10 having power and signal lines to supply electricity to the keysheet module 1 and to send and receive signals. The spacer 80 of the keysheet module 1 is formed with part mounting holes 8c at positions corresponding to the LEDs 5 and electric elements 6 so that the LEDs 5 and electric elements 6 protrude from the part mounting holes 8c.

In such a conventional keysheet module, its components such as contact switches, LEDs, and electric elements including resistor and capacitors need to be arranged in a limited space to meet a demand for reduced weight and size, however, as a result, it makes the wiring patterns very complex. For example, to connect separate wiring patterns formed on a double-sided printed circuit board without crossing (short-circuiting) other wiring patterns in between, it is necessary to form wiring patterns on both of top and bottom surfaces of the printed circuit board 20 and connect them via through-holes, as shown in FIG. 4.

The connection between top and bottom wiring patterns on the double-sided printed circuit board will be explained in detail by referring to FIG. 4. On the printed circuit board 20 there are formed wiring patterns 4e, 4f, 4g a predetermined distance apart from each other. To connect the wiring patterns 4e, 4g without crossing (short-circuiting) the wiring pattern 4f lying therebetween, conventional practice involves forming a pair of through-holes 22, 22 in the printed circuit board 20 and another wiring pattern 21 on the back of the printed circuit board 20 and connecting the wiring patterns 4e, 4g via the through-holes 22, 22 and the wiring pattern 21.

When such a double-sided printed circuit board is used, the need to form these through-holes 22, 22 and back-surface wiring pattern 21 increases cost compared with a one-sided printed circuit board.

Thus, most of the conventional keysheet modules are known to be constructed by a one-sided printed circuit board rather than a double-sided printed circuit board. FIG. 5 and FIG. 6 show separate wiring patterns on a one-sided printed circuit board connected together three-dimensionally by a chip jumper crossing over a third pattern (see Japanese Patent Disclosure No. 2003-45701).

In FIG. 5 and FIG. 6, three separate wiring patterns 4h, 4i, 4j are formed on the printed circuit board 20. On this printed circuit board 20, a coverlay 17 as an insulating layer is bonded to the upper surface of the circuits and the wiring pattern 4i. Between the wiring patterns 4h, 4j a chip jumper 23 with an inner resistance of 0 Ω is provided. The chip jumper 23 has a body portion 23b enclosed on its circumference with an insulating material and connecting terminals 23a, 23a at both ends of the body portion 23b, with the connecting terminals 23a, 23a secured to the wiring patterns 4h, 4j respectively with solder 24 to three-dimensionally connect the wiring patterns 4h, 4j together over the wiring pattern 4i.

In the above method that uses the chip jumper 23 on the one-sided printed circuit board, however, since the volume of the chip jumper 23 is large, the chip jumper 23 when placed on the printed circuit board 20 is unavoidably arranged at positions that block the light emitted from the LEDs 5, as shown in FIG. 3, as in the case of the electric elements 6, thereby significantly degrading a keypad illumination efficiency.

Further, for the chip jumpers 23 to be arranged on the printed circuit board 20, the spacer 80 needs to be formed with part mounting holes for the chip jumpers 23. This in turn reduces a reflection area for the LEDs 5, also degrading the keypad illumination efficiency.

SUMMARY OF THE INVENTION

An object of this invention is to provide a keysheet module which, even if constructed by a one-sided printed circuit board, is free from limitations on the locations of circuit elements and allows them to be arranged at optimum positions to enhance a keypad illumination efficiency and which can make for reducing thickness and cost of the keysheet module.

To achieve the above objective, the keysheet module of this invention comprises: a one-sided printed circuit board formed on one side with a plurality of wiring patterns; and contact switches, LEDs for illuminating a keypad, and a switch fixing sheet covering an upper surface of the contact switches, all provided on the one-sided printed circuit board; wherein an insulating layer is provided between predetermined, separate wiring patterns of the plurality of wiring patterns and, a conductive film jumper is formed over the insulating layer to three-dimensionally connect the separate wiring patterns.

The one-sided printed circuit board used in the keysheet module of this invention may be formed by a resilient polyimide film or polyethylene terephthalate film.

The conductive film jumper may be a printed jumper formed by printing a conductive paste over the insulating layer.

Further, the reliability of the keysheet module can further be improved by applying an insulating coat for the prevention of short-circuit, wire break and discoloration to the surface of the printed jumper.

With this invention, since a three-dimensional connection is realized by a very thin conductive film jumper, electric elements such as resistors and capacitors can be located at any desired positions. For example, the electric elements can be disposed remote from LEDs so as not to block light from the LEDs. This improves an illumination efficiency of LEDs. Further, a degree of LED positioning freedom is enhanced. For example, disposing the LEDs at intermediate positions between the contact switches can make the distribution of light from the LEDs unifom, and as a result, it enhances the keypad illumination efficiency even further.

Further, since the electric elements can be mounted remote from the LEDs, the part mounting holes formed in the spacer around the LEDs can be made small. As a result, the reflection area of the spacer can be made that much larger, improving the reflection efficiency of light emitted from the LEDs. These synergetic effects greatly enhance the keypad illumination efficiency.

DETAILED DESCRIPTION OF THE PREFERRED EMBODIMENT

Now, the keysheet module in a preferred embodiment of this invention will be described in detail by referring to the accompanying drawings.

Figure 1:
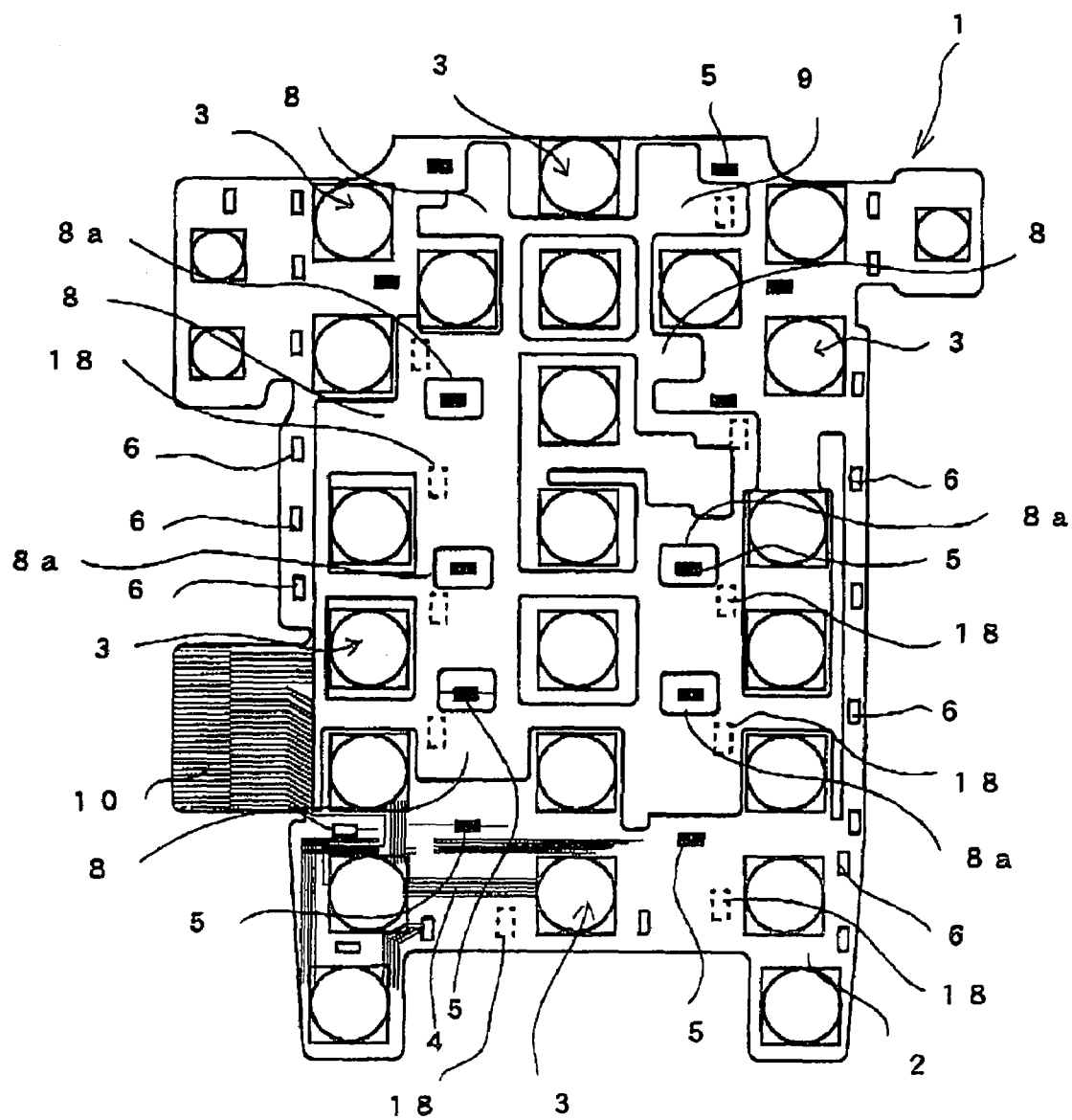
FIG. 1 is a plan view of a keysheet module in accordance with this invention.

In FIG. 1, the keysheet module 1 is put on the underside of a keypad (not shown) which has a plurality of key tops. The keysheet module 1 comprises a one-sided printed circuit board 2 having a fine wiring patterns 4 formed on one side thereof, a plurality of dome-shaped contact switches 3 provided on an upper surface of the one-sided printed circuit board 2, LEDs 5 arranged appropriately between the wiring patterns 4 to illuminate the keypad, electric elements 6 such as resistors and capacitors, a white spacer 8 as a reflection plate fixedly bonded to the upper surface of the one-sided printed circuit board 2 to reflect upward the light emitted from the LEDs 5, a transparent switch fixing sheet 9 fixedly bonded to the upper surface of the white spacer 8 to cover the contact switches 3 for their secure holding, and a flexible connector 10 having power and signal lines to supply electricity to the keysheet module 1 and also to send and receive signals. The white spacer 8 is formed with part mounting holes 8a at positions corresponding to the LEDs 5.

The one-sided printed circuit board 2 is formed by a flexible film, such as polyimide film and polyethylene terephthalate film. As the polyimide film, "Kapton (registered tradename of DuPont of U.S.)" of Toray Corporation, for example, may be used. As the polyethylene terephthalate film, "Lumirror (registered tradename)", for example, may be used.

Of these films, the polyimide film has a very high heat resistance and thus can cope well with a reflow temperature of lead-free solder and be formed into a very thin, flexible one-sided printed circuit board 2.

When a polyethylene terephthalate film with low heat resistance is used, the LEDs 5 and the electric elements 6 can be secured to the one-sided printed circuit board 2 with a conductive adhesive agent without using a solder. This allows for a further cost reduction.

Figure 2:
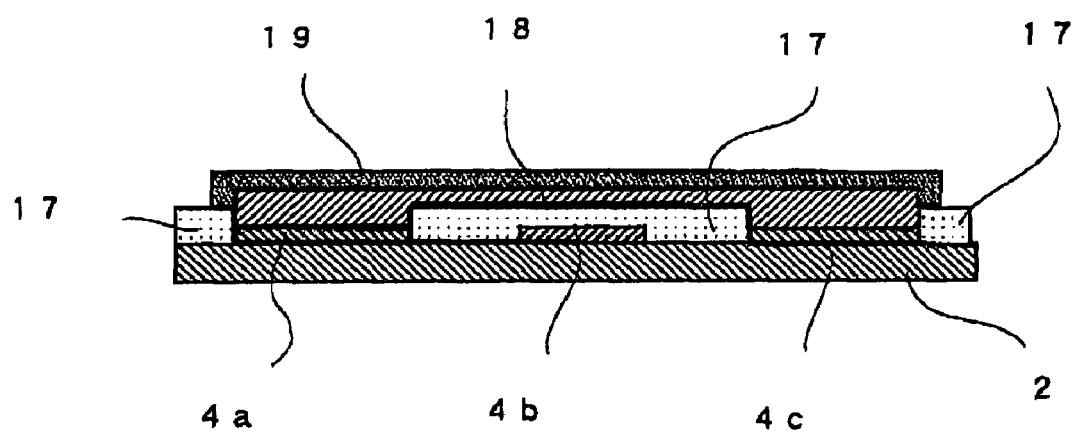
FIG. 2 is an enlarged cross-sectional view of a printed jumper applied to the keysheet module in accordance with this invention.
Figure 3:
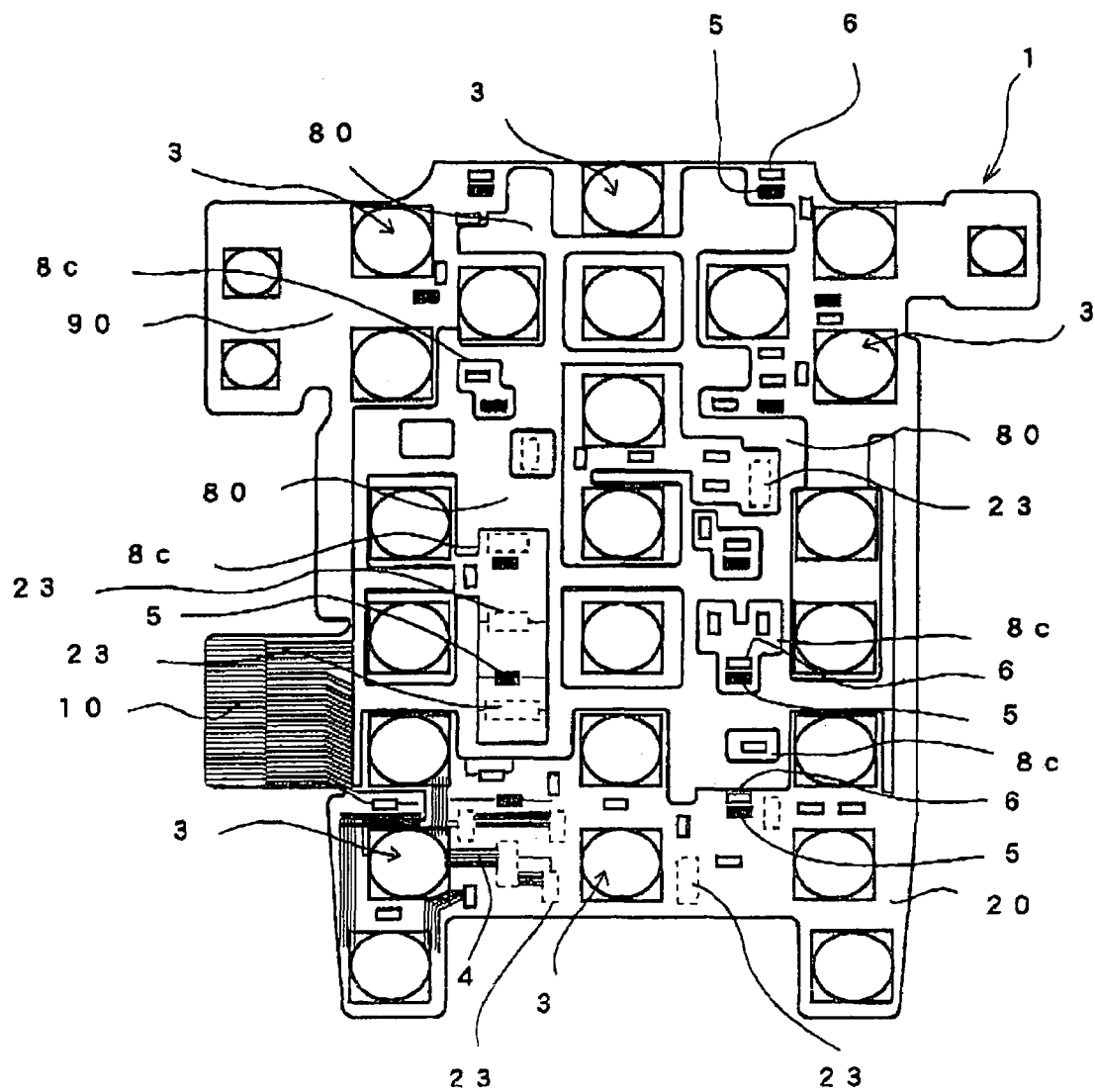
FIG. 3 is a plan view of an example conventional keysheet module.
Figure 4:
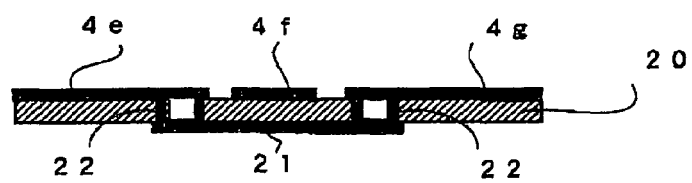
FIG. 4 is an enlarged cross-sectional view showing how wires on the conventional keysheet module using a double-sided printed circuit board are connected via through-holes.
Figure 5:
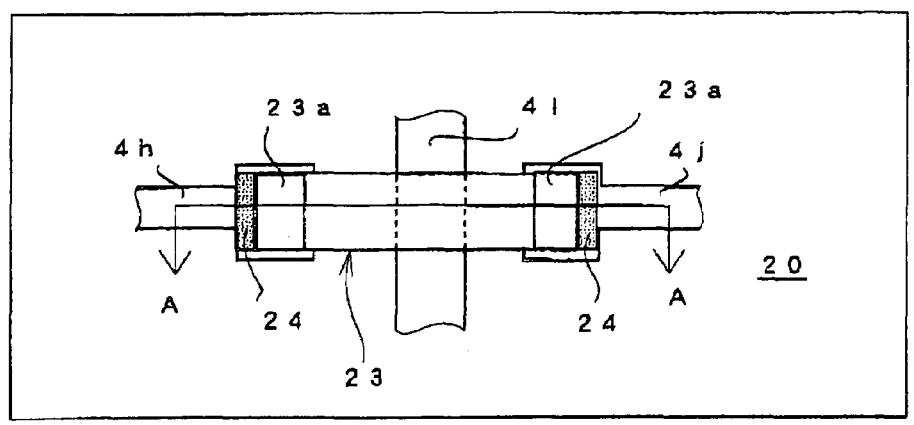
FIG. 5 is a plan view showing how wires on the conventional keysheet module using a one-sided printed circuit board are connected via a chip jumper.
Figure 6:
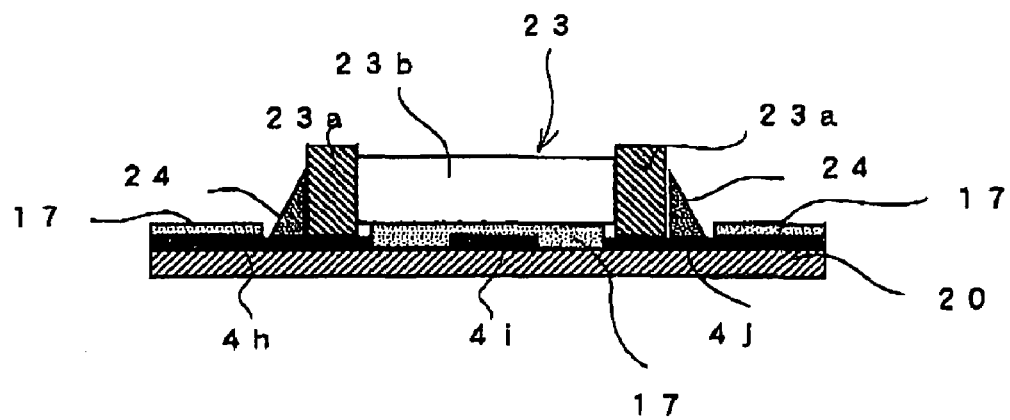
FIG. 6 is a cross section taken along the line A—A of FIG. 5.

A feature of the keysheet module 1 of this invention is the use of a printed jumper 18, such as shown in FIG. 1 and FIG. 2, that allows the electric elements 6, such as resistors and capacitors, to be arranged at optimum positions independently from the LEDs 5 on the one-sided printed circuit board 2.

When, for example, three wiring patterns 4a, 4b, 4c are formed on the one-sided printed circuit board 2, as shown in FIG. 2, the printed jumper 18 is used to three-dimensionally connect the side wiring patterns 4a, 4c. More specifically, the thin-film printed jumper 18 is formed on the one-sided printed circuit board 2 by applying a coverlay 17, which forms an insulating layer, over the upper surface of the circuits and the wiring pattern 4b through a printing technique and then printing, from above the coverlay 17, a conductive paste between the separate wiring patterns 4a, 4c.

The printed jumper 18 formed in this manner does not occupy as large a volume as the conventional one and can three-dimensionally connect the separate wiring patterns 4a, 4c by crossing over the wiring pattern 4b situated therebetween.

The conductive paste for the printed jumper 18, for example, may use a resin paste kneaded with metal powder (silver, aluminum, copper and gold) and carbon. It is also possible to use a conductive paste with excellent bendability and adhesion performance to give the printed jumper 18 a resiliency.

In the embodiment of FIG. 2, an insulating coat 19 is printed over the surface of the printed jumper 18. The insulating coat 19 may use, for example, insulating coat materials, such as insulating ink, solder resist and coverlay, and overcoat materials. The insulating coat 19 effectively prevents a short-circuit and a wire break which would other-wise be caused by deflections of the printed jumper 18 and also prevents discoloration of the printed jumper 18 due to aged deterioration.

Since the printed jumper 18 is formed by a printing technique, it can be formed very thin and fine and basically at any desired positions on the one-sided printed circuit board 2 except for those positions of components, such as the contact switches 3, LEDs 5 and electric elements 6.

In this invention since the printed jumper 18 of the above construction is disposed over a wiring pattern between separate wiring patterns to three-dimensionally connect the separate wiring patterns, the degree of freedom of positioning LEDs 5 and electric elements 6 is enhanced, making it possible to position them optimally.

The locations of the electric elements 6 such as resistors and capacitors will be explained.

In this invention, as shown in FIG. 1, the printed jumper 18 is provided over a wiring pattern between separate wiring patterns to three-dimensionally connect the separate wiring patterns, one of which is connected to an electric element 6, thereby allowing the electric element 6 to be disposed at a desired position on the one-sided printed circuit board 2.

Therefore, the positions of the electric elements 6 including resistors and capacitors can be determined without being restrained by limitations on their positions. This obviates the need to dispose them near the LEDs 5 as is required by the conventional keysheet module.

In this embodiment, therefore, a plurality of electric elements 6 can be arranged at the left and right side of the one-sided printed circuit board 2 away from the LEDs 5 so that they do not block light emitted from the LEDs 5, as shown in FIG. 1.

Since the printed jumper 18 is very thin, even if it is formed on the underside of the white spacer 8, which functions as a reflection plate to reflect upward the light emitted from the LEDs 5, the printed jumper 18 does not protrude from the white spacer 8. Thus, there is no need to provide the white spacer 8 with part mounting holes for the printed jumpers 18.

Disposing the electric elements 6 at the above-described positions eliminates obstacles that would otherwise block the light from the LEDs 5, thus enhancing a light emitting efficiency of the LEDs 5 (keypad illumination efficiency). Further, since the white spacer 8 as a reflection plate need only be formed with a minimum required number of part mounting holes, a reflection area of the white spacer 8 can be increased, enhancing the reflection efficiency of the light of LEDs 5. These advantages are combined to significantly improve the keypad illumination efficiency.

It is noted that since the printing of the jumper 18 is performed before the contact switches 3, the LEDs 5 and the electric elements 6 are mounted, these components can be added later on.

The best positions on the one-sided printed circuit board 2 at which to dispose the electric elements 6 are left and right peripheries of the one-sided printed circuit board 2 remote from the LEDs 5, as shown in FIG. 1. By arranging the electric elements 6 at these positions, the light emitted from the LEDs 5 is free from obstructions and thus can illuminate the keypad most effectively. Further, since the electric elements 6 are also remote from the contact switches 3, there is no problem in illuminating the contact switches 3 and their surroundings. Further, since the white spacer 8 as the reflection plate need only be formed with part mounting holes for the LEDs 5, the reflection area of the spacer 8 can be increased to the maximum, enhancing the reflection efficiency of the light from the LEDs 5.

Next, the positions of the LEDs 5 will be explained.

As with the positions of the electric elements 6, such as resistors and capacitors, this invention can also secure a freedom with which to locate the LEDs 5. That is, as shown in FIG. 1, the printed jumper 18 is provided over a wiring pattern between separate wiring patterns to three-dimensionally connect the separate wiring patterns, one of which is connected to an LED 5, thereby allowing the LED 5 to be disposed at a desired position on the one-sided printed circuit board 2. As a result, as with the electric elements 6, the positions of the LEDs 5 can also be determined without being restrained by limitations on their positions.

In the embodiment of this invention, the LEDs 5 are disposed at intermediate positions between the contact switches 3, as shown in FIG. 1, so that a distribution of light emitted from the LEDs 5 is uniform. With this arrangement the distribution of light from the LEDs 5 becomes uniform over the one-sided printed circuit board 2, further enhancing the keypad illumination efficiency of the LEDs 5.

One preferred embodiment of this invention has been described. It is noted that the invention is not limited to this embodiment. For example, a conductive film jumper bonded with a thin conductive sheet may be used instead of the printed jumper.

As described above, since this invention uses a thin conductive film jumper to optimize the positions of LEDs and electric elements, not only can the keypad illumination efficiency on the one-sided printed circuit board be improved significantly but the keysheet module can also be reduced in thickness and cost. It is also possible to give a resiliency to the entire keysheet module.

This invention provides a keysheet module applicable for a wide range of electronic devices, including cell phones, DVD drives, audio equipment and digital cameras.

What is claimed is:

1. A keysheet module comprising:
    a one-sided printed circuit board having a plurality of wiring patterns formed on one side of said circuit board:
    contact switches, LEDs for illuminating a keypad, and a switch fixing sheet covering an upper surface of the contact switches, all provided on said one-sided printed circuit board,
    wherein said keysheet module has at least one connecting wiring pattern whereby one wiring pattern of the plurality of wiring patterns is connected to at least one other non-adjacent wiring pattern of the plurality of wiring patterns, and
    wherein the connecting wiring pattern crosses at least one adjacent intervening wiring pattern which is covered by an insulating layer, and the connecting wiring pattern allows electrical connection by a conductive film jumper formed over said insulating layer.

2. A keysheet module according to claim 1, wherein the one-sided printed circuit board is formed by a resilient polyimide film or polyethylene terephthalate film.

3. A keysheet module according to claim 1, wherein the conductive film jumper is a printed jumper formed by a conductive paste over the insulating film.

4. A keysheet module according to claim 1, wherein an insulating coat is applied over a surface of the conductive film jumper.

5. A keysheet module according to claim 1, wherein a plurality of connected wiring pattern structures are provided on said one-side printed circuit board.

6. A keysheet module comprising:
    a one-sided printed circuit board:
    contact switches, LEDs for illuminating a keypad, and a switch fixing sheet covering an upper surface of the contact switches, all provided on said one-sided printed circuit board;
    at least one set of first, second and third of wiring patterns formed on one side of said circuit board, said third wiring pattern extending between and being spaced from, said first and second wiring patterns; and
    at least one structure for connecting said first and second wiring patterns and crossing said third wiring pattern, wherein said structure comprises:
        an insulating layer covering said third wiring pattern; and
        a conductive film jumper formed over said insulating layer and conductively connecting said first and second wiring patterns together, said jumper being insulated from said third wiring pattern by said insulating layer-.

7. A keysheet module according to claim 6, wherein there are a plurality of said sets of first, second and third of wiring patterns and a corresponding plurality of said structures, each associated with a respective one of said sets of first, second and third of wiring patterns.

8. A keysheet module according to claim 6, wherein the one-sided printed circuit board is formed by a resilient polyimide film or polyethylene terephthalate film.

9. A keysheet module according to claim 6, wherein the conductive film jumper is a printed jumper formed by a conductive paste over the insulating film.

10. A keysheet module according to claim 6, wherein an insulating coat is applied over a surface of the conductive film jumper.

\* \* \* \* \*